US012798007B2

(12) United States Patent
Andersson et al.

(10) Patent No.: US 12,798,007 B2
(45) Date of Patent: Nov. 17, 2026

(54) METHOD OF MANUFACTURING A GUIDE ROLLER, AND CORRESPONDING GUIDE ROLLER AND WIRE ROLLING MACHINE

(71) Applicant: AKTIEBOLAGET SKF, Gothenburg (SE)

(72) Inventors: Marcus C. Andersson, Molndal (SE); Benjamin Michael, Kaisten (DE); Gregory Dunon, Paris (FR)

(73) Assignee: AKTIEBOLAGET SKF, Gothenburg (SE)

( * ) Notice: Subject to any disclaimer, the term of this patent is extended or adjusted under 35 U.S.C. 154(b) by 293 days.

(21) Appl. No.: 18/559,820

(22) PCT Filed: May 30, 2022

(86) PCT No.: PCT/EP2022/064629
§ 371 (c)(1),
(2) Date: Nov. 9, 2023

(87) PCT Pub. No.: WO2022/253764
PCT Pub. Date: Dec. 8, 2022

(65) Prior Publication Data

US 2024/0139879 A1 May 2, 2024

(30) Foreign Application Priority Data

Jun. 2, 2021 (DE) ......................... 102021205647.4

(51) Int. Cl.
*B23K 26/342* (2014.01)
*B21B 39/16* (2006.01)
(Continued)

(52) U.S. Cl.
CPC .......... *B23K 26/342* (2015.10); *B21B 39/165* (2013.01); *B23K 10/027* (2013.01);
(Continued)

(58) Field of Classification Search
CPC .................................................... B21B 39/165
See application file for complete search history.

(56) References Cited

U.S. PATENT DOCUMENTS 9,263,224 B2 * 2/2016 Hunt ..................... H01J 35/104
10,197,098 B1 2/2019 Kuepper
(Continued)

FOREIGN PATENT DOCUMENTS

CN 1351919 A * 6/2002
CN 2552617 Y * 5/2003
(Continued)

OTHER PUBLICATIONS

Iwatani, Shingo, et al. "Laser cladding of Fe—Cr—C alloys on A5052 aluminum alloy using diode laser." Materials transactions 46.6 (2005): 1341-1347. (Year: 2005).*
(Continued)

*Primary Examiner* — Jacob J Cigna
(74) *Attorney, Agent, or Firm* — J-TEK LAW PLLC; Scott T. Wakeman; Mark A. Ussai

(57) ABSTRACT

A method for manufacturing a guide roller for hot wire rolling includes the steps of providing a guide roller made of an Al alloy, the guide roller including a wire guiding surface, and applying a coating onto at least a part of the wire guiding surface by a metallic wire Direct Energy Deposition (DED) operation and/or a metallic powder DED operation.

14 Claims, 2 Drawing Sheets

(51) Int. Cl.

| | |
|---|---|
| ***B23K 10/02*** | (2006.01) |
| ***B23K 15/00*** | (2006.01) |
| ***B23K 26/00*** | (2014.01) |
| ***B23K 103/04*** | (2006.01) |
| ***B23K 103/18*** | (2006.01) |
| ***B33Y 10/00*** | (2015.01) |

(52) U.S. Cl.

CPC ...... *B23K 15/0086* (2013.01); *B23K 15/0093* (2013.01); *B23K 26/0006* (2013.01); *B23K 2103/05* (2018.08); *B23K 2103/26* (2018.08); *B33Y 10/00* (2014.12)

(56) References Cited

U.S. PATENT DOCUMENTS

| | | | | |
|---|---|---|---|---|
| 11,104,981 | B2 * | 8/2021 | Chen | B23K 26/342 |
| 11,673,211 | B2 * | 6/2023 | Wu | B21J 7/22 219/76.1 |
| 11,865,620 | B2 * | 1/2024 | Zhong | B22F 12/45 |
| 2014/0355743 | A1 | 12/2014 | Hunt et al. | |
| 2015/0219148 | A1 | 8/2015 | Wemhoener | |
| 2015/0360289 | A1 | 12/2015 | Liou et al. | |
| 2017/0321746 | A1 | 11/2017 | Yang et al. | |
| 2019/0126387 | A1 * | 5/2019 | Fux | B23K 26/323 |
| 2019/0217417 | A1 | 7/2019 | Wu et al. | |
| 2020/0200223 | A1 | 6/2020 | Bachmann et al. | |
| 2021/0078078 | A1 | 3/2021 | Zhong et al. | |
| 2024/0025688 | A1 * | 1/2024 | Echerer | B65H 27/00 |
| 2024/0238870 | A1 | 7/2024 | Andersson et al. | |
| 2024/0263673 | A1 | 8/2024 | Andersson et al. | |

FOREIGN PATENT DOCUMENTS

| | | | |
|---|---|---|---|
| CN | 201988569 | U * | 9/2011 |
| CN | 103882424 | A * | 6/2014 |
| CN | 207479197 | U | 6/2018 |
| CN | 107584118 | B | 12/2019 |
| CN | 212525467 | U | 2/2021 |
| CN | 112496344 | A | 3/2021 |
| EP | 3542928 | A1 | 9/2019 |
| EP | 3557042 | A1 | 10/2019 |
| EP | 3781829 | A1 | 2/2021 |
| EP | 3781829 | B1 | 6/2022 |
| GB | 2491472 | A | 12/2012 |
| JP | S61104063 | A | 5/1986 |
| JP | S6238791 | A | 2/1987 |
| WO | 2019202200 | A1 | 10/2019 |
| WO | 2020005872 | A1 | 1/2020 |

OTHER PUBLICATIONS

Translation of CN-2552617-Y (Year: 2002).*

Translation of CN-1351919-A (Year: 2002).*

Communication from the European Patent Office dated Nov. 25, 2024 in related EP application No. 22 732 059.5.

International Search Report and Written Opinion dispatched Dec. 8, 2022 in related application No. PCT/EP2022/064629.

Office Action from the USPTO mailed Feb. 2, 2026 in related U.S. Appl. No. 18/559,808.

Office Action from the USPTO mailed Aug. 18, 2025 in related U.S. Appl. No. 18/559,828.

Office Action from the USPTO mailed Jan. 1, 2026 in related U.S. Appl. No. 18/559,828.

AST Bearings, Bearing Materials, Screen shot taken on Jan. 5, 2018, available at https://www.astbearings.com/bearing-materials.html (Year: 2018).

* cited by examiner

METHOD OF MANUFACTURING A GUIDE ROLLER, AND CORRESPONDING GUIDE ROLLER AND WIRE ROLLING MACHINE

TECHNICAL FIELD

The present invention concerns a method for manufacturing a guide roller. The present invention also concerns a guide roller and a wire rolling machine.

CROSS-REFERENCE

This application is the U.S. National Stage of International Application No. PCT/EP2022/064629 filed on May 30, 2022, which claims priority to German patent application no. 10 2021 205 647.4 filed on Jun. 2, 2021.

BACKGROUND OF THE INVENTION

Guide rollers are well known components in hot wire rolling production. Wire is formed by rolling material in steps into its final form by leading it through roll passes consisting of rollers with different distance and profile settings, thereby gradually rolling the wire into its final shape. Guide rollers help the rolled wire to enter and exit the roll passes accurately and stably.

To increase wire rolling production speed the material to form the wire is heated to high temperature to increase its moldable characteristics. In this high-speed hot wire rolling production, the wire can be fed in around 100 m/s, yet the production suffers from having very short uptime, such as only a few hours. This due to guide roller surface degradation as a consequence of the combination of high temperature of the wire, water cooling and its high throughput speed.

Guide rollers are often made of solid iron-based materials to cope with these harsh conditions. This make the guide rollers heavy resulting in large moment of inertia when the wire is led in high speed to be guided by the guide roller. This inertia may result in excessive surface degradation of the guide roller as well as poor surface quality of the wire itself.

To reduce the guide rollers' weight, it is known to make the guide rollers by using metal matrix composites. Metal matrix composites are made by putting a lighter metal alloy powder in a steel matrix structure, then applying hot isostatic pressing for compactization. The metal alloy powder used for guide rollers may be made from particles such as titanium carbide (TiC) that are lighter compared with the steel matrix and iron-based alloys, thus some weight reduction may be achieved. However, the metal alloy powder particles are coarse and result in a coarse microstructure in the final guide roller, which may result in crack networks upon thermal and mechanical shock conditions.

SUMMARY OF THE INVENTION

In view of the above, an object of the invention is to provide an improved method for manufacturing a guide roller which to at least some extent overcomes some of the issues with the prior art. A further object is to provide an improved guide roller. A yet further object is to provide an improved wire rolling machine.

At least one of these objects is achieved by a method for manufacturing a guide roller for hot wire rolling comprising the steps of:

- providing a guide roller made of an Aluminium (Al) alloy having a wire guiding surface; and
- applying a coating onto the wire guiding surface by means of a metallic wire Direct Energy Deposition (DED) operation and/or a metallic powder DED operation.

By the provision of the method as disclosed herein, an improved guide roller is provided, in which the guide roller is made from a lightweight Al-alloy having at least one coating applied by a DED operation, such as a laser cladding operation. In particular, it has been realized that by using a metallic wire and/or powder DED operation, a coating can be applied with pulses of directed energy at a particular spot. In this way the coating quickly cools again without affecting the surrounding material in a significant way. Thereby, an otherwise sensitive but light material, such as an aluminium alloy, can be used as a base for applying a coating of a high performing material which is better in handling the wear and tear from the wire. As such, a guide roller that does not need to handle heavy loads for forming the wire per se, can be made of a lightweight aluminium alloy. Thereby, the wear emanating from inertia due to heavy guide rollers can be significantly reduced. Further, as the coating material is rapidly heated and cooled, the microstructure of the coating is refined, thereby significantly improving the thermal and shock resistance of the guide roller.

DED, such as laser cladding, as used herein means a surface welding operation which enables a metallurgical bonding of the steel wire material and/or steel metal powder to the metallic ring member, thereby providing a DED bonded surface on the metallic ring member. Other examples of DED, except laser cladding, are plasma transferred arc (PTA), electron beam melting (EBM), selected laser melting (SLM) and cold spray coating.

Optionally, the metallic wire and/or the metallic powder is any of a Ni-based alloy, a Co-based alloy or a Fe-based alloy, such as a stainless steel. Thereby, a corrosion, heat and wear resistant coating can be provided by the DED operation, implying a high-performance surface coating formed on the aluminium roller.

By Ni/Co/Fe based alloys is meant alloys comprising 50 wt % or more of the mentioned base. By stainless steel is meant a Fe-based alloy comprising 12 wt % or more of Cr.

Optionally, applying the coating may comprise applying more than one layer by use of DED, such as 2-20 layers. Providing more than one layer, such as 2-20 layers, has shown to result in a high-performance coating with a satisfactory thickness for more demanding conditions. This may also reduce the amount of heat transferred to the aluminium part of the guide roller, implying a reduced risk of deforming during operation.

Optionally, applying the coating may be done by varying the application speed. Thereby, one or more layers with different radial thickness may be applied onto the aluminium guide roller member. For example, the guide roller may be rotated with respect to a rotational axis of the guide roller while applying the coating, wherein the rotational speed is varied during application of the steel wire and/or steel metal powder on the guide roller. By varying the speed, less heat may be transferred to the guide roller during the DED operation. According to an example embodiment, the speed is varied by decreasing the speed at least one time during the application of the load carrying surface. Thereby a relatively high speed can be used when e.g. applying a first layer directly onto the guide roller, whereby a relatively low speed can be used when applying one or more additional layers on the first layer. Consequently, the first layer will be thinner than the one or more additional layers. This will result in that less heat will be transferred to the guide roller, thereby reducing the risk of deforming the guide roller during the DED operation, e.g. the laser cladding operation.

Still further, by varying the application speed, a surface with a varying radius may be provided with a coating with a substantially uniform thickness. For example, the guide roller may have for instance a concave or V-shaped wire guiding surface, i.e. presenting different radial distance from the guide roller's rotational axis, subsequently yielding different surface speed as the guide roller is rotated during application of the coating. Accordingly, the application speed may be varied such that a constant surface speed is achieved during the DED operation, thereby ensuring that a coating with a substantially uniform thickness is provided thereon.

Optionally, the speed when applying the coating by DED, i.e. the rotational speed of the guide roller, may be in the range of 0.5 to 1000 m (meter) per minute. According to an example embodiment, the DED speed is higher than 1 m per minute, such as higher than m per minute, e.g. 80-120 m/minute, implying a reduced risk of deforming the aluminum guide roller. It has namely been found that a higher DED speed, such as rotational speed of the guide roller, may reduce the risk of deforming the aluminum guide roller. Thereby, by e.g. using a higher laser cladding speed an improved guide roller may be provided.

Optionally, when the DED operation is laser cladding, the laser power used when applying the coating may be 1-15 kW (kilowatts), such as 2-6 kW.

According to a further aspect of the present invention, a guide roller for hot wire rolling is presented. The guide roller is made of an Al alloy and has a wire guiding surface for receiving wire. A coating covers at least part of the wire guiding surface, wherein the coating has been applied by use of a DED operation.

It has been realized that by using a metallic wire and/or powder DED operation, a coating can be applied using pulses of highly directed energy at a particular spot with very high precision. In this way the coating quickly cools again without affecting the surrounding material very much. As such, it enables a more sensitive but light material, such as an aluminium alloy, to be used as a base for a guide roller. Thereby, wear emanating from inertia due to heavy guide rollers can be significantly reduced. Further, as the coating material is rapidly heated and cooled, the microstructure of the coating may be refined, thereby significantly improving the thermal and shock resistance of the guide roller.

Optionally, the coating is made of any of a Ni based alloy, a Co based alloy or a Fe based alloy, such as a stainless steel. Thereby, a corrosion, heat and wear resistant coating can be provided by the DED operation, implying a high-performance surface coating formed at the aluminium guide roller.

Optionally, the coating thickness is from 0.25 mm to 2 mm, as seen in a radial direction of the guide roller. It has been found that a layer as thin as 0.050 mm can be applied by using DED operation, already improving an aluminum guide roller's wear resistance. Preferably, a coating thickness of at least 0.25 mm is used to ensure robustness of the coating over time. As such, thin layers of coating can be applied and by keeping the coating thickness thin, a coating made from high performing yet often costly materials, such as Co and Ni based alloys may be used. Thereby, the cost for manufacturing guide rollers may stay competitive despite using more high performing materials.

According to a yet further aspect of the present invention, a wire rolling machine comprising a guide roller according to any one of the embodiments herein and/or which has been manufactured by a method according to any of the embodiments herein is presented. Thereby, a wire rolling machine with increased service life and production up time is achieved, with increased capability to produce a better-quality wire for a longer period of time between service intervals.

BRIEF DESCRIPTION OF THE DRAWINGS

The present invention will hereinafter be further explained by means of non-limiting examples with reference to the appended schematic figures, where.

It should be noted that the drawings have not necessarily been drawn to scale and that the dimensions of certain features may have been exaggerated for the sake of clarity. Like reference numerals in the drawings refer to similar parts unless expressed otherwise.

DETAILED DESCRIPTION OF PREFERRED EMBODIMENTS

Figure 1:
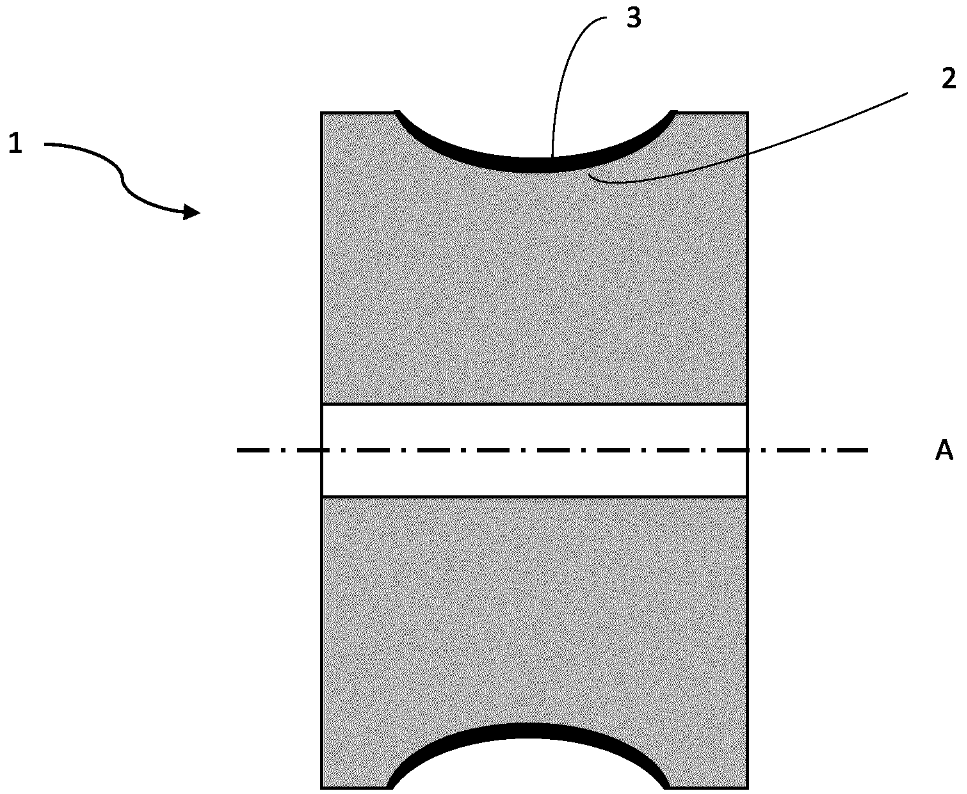
FIG. 1 is a cross-sectional view of a guide roller according to an example embodiment of the present invention.

FIG. 1 depicts a cross-sectional view of a guide roller 1 according to an example embodiment of the present invention. The cross-sectional view is defined by a plane which extends along a rotational axis A of the guide roller 1. The guide roller 1 is made from an aluminium (Al) based alloy and comprises a wire guiding surface 2 to receive and guide a wire (not shown) to a certain position in the wire rolling machinery 4 (see FIG. 3). The wire guiding surface 2 in the shown embodiment has a concave shape, but it could also have any other shape, such as V-shaped, spherical or tapered shape depending on the requirements of a particular guide roller 1.

The guide roller 1 further comprises a coating 3 covering at least part of the wire guiding surface 2. The coating 3 has been applied to the aluminum guide roller 1 by means of a metallic wire Direct Energy Deposition (DED) operation and/or a metallic powder DED operation.

The coating 3 may be made from a material with high red hardness, such as Ni based alloy, a Co based alloy or a Fe based alloy mixed with Cr, such as a stainless steel. By red hardness is meant the ability of a material to retain the hardness and durability upon heating to red heat, i.e when the material turns red, typically >600 degrees Celsius for steel.

Other alloying elements in the coating 3 material to obtain high red hardness may further be any of tungsten, molybdenum, cobalt and vanadium.

The coating 3 thickness may preferably be from 0.25 mm to 2 mm, as seen in a radial direction of the guide roll. This to ensure enough protection of the aluminum guide roll from the hot wire, yet without consuming too much of the high performing and costly coating 3 material. By the radial direction is meant a direction which is perpendicular to and intersects with the rotational axis A of the guide roller 1.

Figure 2:
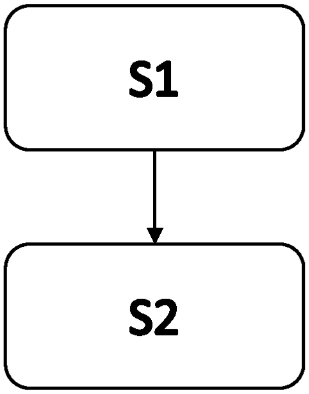
FIG. 2 is a flowchart of a method according to an example embodiment of the present invention.

FIG. 2 depicts a flowchart of a method according to an example embodiment of the present invention. The method is a method for manufacturing a guide roller 1, such as the guide roller 1 shown in FIG. 1.

The method comprises:

S1: providing a guide roller 1 made of an Al alloy and comprising a wire guiding surface 2, S2: applying a coating 3 onto at least part of the wire guiding surface 2 by means of a metallic wire Direct Energy Deposition (DED) operation and/or a metallic powder DED operation.

The step S2 may be followed by a subsequent step of machining the applied coating 3, such as by grinding, honing or polishing the coating 3. This to form a finer surface structure, thereby reducing friction when receiving the wire.

Preferably, applying the coating 3 comprises applying more than one layer by use of DED, such as 2-20 layers.

Further, the application speed may be varied during application of the metallic wire material and/or metallic powder on the guide roller 1. For example, the speed may be varied by decreasing the speed at least one time during the application of the coating 3. Thereby, a thin layer may first be provided on the guide roller 1 using a relatively higher application speed, followed by one or more thicker layers as the application speed is reduced, until e.g. a final radial thickness of 0.25 mm-2 mm is obtained.

The wire guiding surface 2 of the guide roller 1 as shown in FIG. 1 has a varying radius, as seen in the cross-sectional view. In this embodiment, the radius is varying such that a concave outer profile is formed, i.e forming a groove having a shorter radial distance to the rotational axis A of the guide roller 1. As may be gleaned from FIG. 1, also the coating 3 may become thicker in the lower part of the groove. This may be due to relatively lower surface speed during the coating 3 application step compared to the portions at greater radial distance from the guide roller's 1 rotational axis A. According to an example embodiment, the rotational speed of the guide roller 1 during the application of the coating 3 is varied such that a constant surface speed is achieved. Thereby a coating 3 with a uniform thickness can be obtained.

Figure 3:
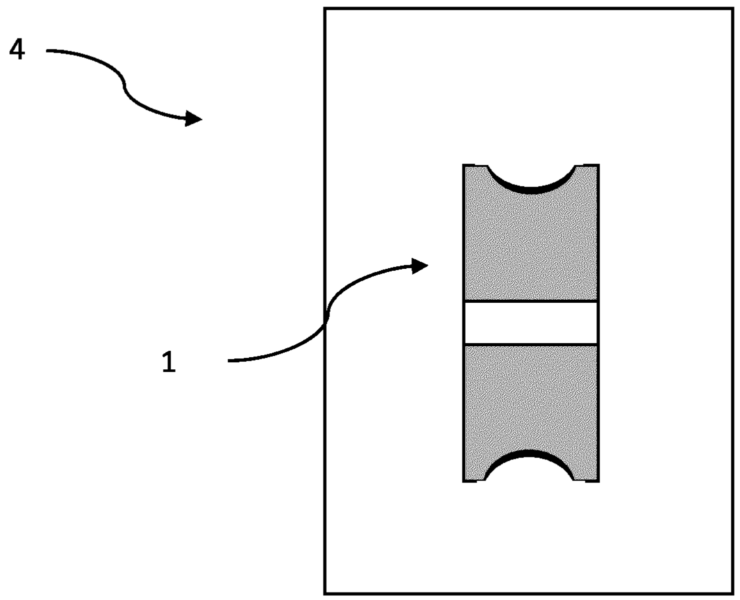
FIG. 3 is a schematic view of a wire rolling machine comprising a guide roller according to an example embodiment of the present invention.

FIG. 3 depicts a schematic view of a wire rolling machine 4 comprising a guide roller 1 according to an example embodiment and/or a guide roller 1 manufactured according to an example embodiment of the method as disclosed herein. It is to be understood that the wire rolling machine 4 may be any other machinery using guide rollers 1 to feed material in a similar fashion.

It is to be understood that the present invention is not limited to the embodiments described above and illustrated in the drawings; rather, the skilled person will recognize that many changes and modifications may be made within the scope of the appended claims.

The invention claimed is:

1. A method for manufacturing a guide roller for hot wire rolling, the method comprising the steps of:

providing a guide roller including a cylindrical body made of an Al alloy, the guide roller body having an outer annular groove providing a wire guiding surface, and applying a coating within the annular groove and onto at least a part of the wire guiding surface by a metallic wire Direct Energy Deposition (DED) operation and/or a metallic powder DED operation.

2. The method according to claim 1, wherein the DED operation is any of laser cladding, plasma transferred arc (PTA), electron beam melting (EBM) or selected laser melting (SLM).

3. A wire rolling machine comprising a guide roller which has been manufactured by the method according to claim 1.

4. The method according to claim 1, wherein the metallic wire and/or the metallic powder is any of a Ni based alloy, a Co based alloy or a Fe based alloy.

5. The method according to claim 4, wherein the Fe based alloy is a stainless steel.

6. The method according to claim 1, wherein the step of applying the coating includes applying more than one layer by use of DED.

7. The method according to claim 6, wherein the step of applying the coating includes applying 2-20 layers by use of DED.

8. The method according to claim 1, wherein the step of applying the coating is done with a varied application speed.

9. The method according to claim 8, wherein the application speed is varied by decreasing the speed at least one time during application of the coating.

10. A guide roller for hot wire rolling, the guide roller comprising:

a guide ring including a cylindrical body made of an Al alloy, the ring body having an outer annular groove providing a wire guiding surface for receiving wire, and a coating applied within the annular groove and covering at least a part of the wire guiding surface, the coating being applied by a DED operation.

11. The guide roller according to claim 10, wherein the coating is made of any of a Ni based alloy, a Co based alloy or a Fe based alloy.

12. The guide roller according to claim 11, wherein the Fe based alloy is a stainless steel.

13. The guide roller according to claim 10, wherein the coating has a radial thickness with a value of from 0.25 mm to 2 mm.

14. A wire rolling machine comprising a guide roller according to claim 10.

* * * * *